United States Patent [19]
Arimura et al.

[11] 3,818,366
[45] June 18, 1974

[54] POWER SUPPLY SYSTEM
[75] Inventors: Ichiro Arimura, Kyoto; Hiroshi Goto; Hiroshi Matsushima, both of Osaka; Yoshikazu Nakao, Hirakata, all of Japan
[73] Assignee: Matsushita Electric Industrial Co., Ltd., Osaka, Japan
[22] Filed: July 14, 1972
[21] Appl. No.: 272,033

Related U.S. Application Data
[63] Continuation of Ser. No. 77,591, Oct. 2, 1970, abandoned.

[30] Foreign Application Priority Data
Oct. 7, 1969 Japan............................... 44-80461
Oct. 14, 1969 Japan............................... 44-82455
Oct. 14, 1969 Japan............................... 44-82456
Oct. 20, 1969 Japan............................... 44-84349
Oct. 20, 1969 Japan............................... 44-84350
Jan. 24, 1970 Japan............................... 45-6418
June 29, 1970 Japan............................... 45-65609

[52] U.S. Cl............................ 330/207 P, 330/199
[51] Int. Cl........................................... H04f 21/00
[58] Field of Search................ 307/200; 330/207 P

[56]         References Cited
        UNITED STATES PATENTS
3,125,715  3/1964  Brooks................................ 323/22
3,317,792  5/1967  Sutherland..................... 307/202 X
3,365,617  1/1968  Flanagan........................ 307/202 X
3,398,325  8/1968  Shaffer........................... 307/202 X Primary Examiner—Nathan Kaufman
Attorney, Agent, or Firm—Stevens, Davis, Miller & Mosher

[57]              ABSTRACT

A power supply system for an amplifier which is driven by two power supply means of opposite polarity and whose output swings substantially about zero potential level.

The power supply system is provided with means for cutting off the active power supply means earlier than the passive power supply means in the event of the application of an excessively large input or overcurrent to the amplifier, thereby preventing any damage to the amplifier, power supply means and load.

10 Claims, 9 Drawing Figures 3,818,366

POWER SUPPLY SYSTEM

This is a continuation, of U.S. Pat. application Ser. No. 77,591, filed Oct. 2, 1970.

This invention relates to a power supply system for a direct-coupled amplifier structure such as, for example, an OCL amplifier (output condenser-less amplifier) which is favorably used in the industrial field of high-grade, high-fidelity amplifiers, which includes a differential amplifier driven by a positive and a negative power supply voltage of substantially equal magnitude and whose output swings substantially about a zero potential level. More particularly, this invention relates to a novel system for protecting the circuit, load and power supply means for any damage in the event of the application of an excessively large input or overcurrent to the amplifier, or in the event of the occurrence of an unusual condition in the power supply means.

Heretofore, the SEPP-OTL (single-ended push-pull, output transformer-less) amplifier system was favored in the industrial field of high fidelity amplifiers in view of the low cost and high circuit stability, but later progress in techniques and the pursuit of more excellent performance has created the OCL amplifier system, and this OCL amplifier system has been under development in recent years.

However, the OCL amplifier structure involves various problems due to the fact that the output of the OCL amplifier is directly connected to the load or speaker. One of the problems resides in the method of protecting the circuit in an overloaded state. A method of detecting the danger and cutting off the input has been developed in order to protect the circuit and load from danger in an overloaded state, but any effective solution for simultaneously protecting the power supply means from danger has not been proposed yet.

The present invention, therefore, contemplates the provision of a novel system for simultaneously preventing any damage to the circuit, load, etc. by detecting a dangerous state of the circuit and interrupting the supply of power.

It is a primary object of the present invention to provide a protective system for a direct-coupled amplifier structure which includes means such as a differential amplifier driven by a positive and a negative power supply voltage of substantially equal magnitude and whose output swings about a substantially zero potential level, the system having means for interrupting the supply of the positive and negative power supply voltages thereby preventing any damage to the circuit, load and power supply means in the event of the application of an excessively large input or overcurrent to the amplifier or in the event of the occurrence of an unusual condition in the power supply means.

Another object of the present invention is to provide a system of the above character in which the interruption of the supply of the positive and negative power supply voltages is carried out in combination with the detection of an overcurrent.

The above and other objects, features and advantages of the present invention will be apparent from the following detailed description taken in conjunction with the accompanying drawings, in which.

Figure 1:
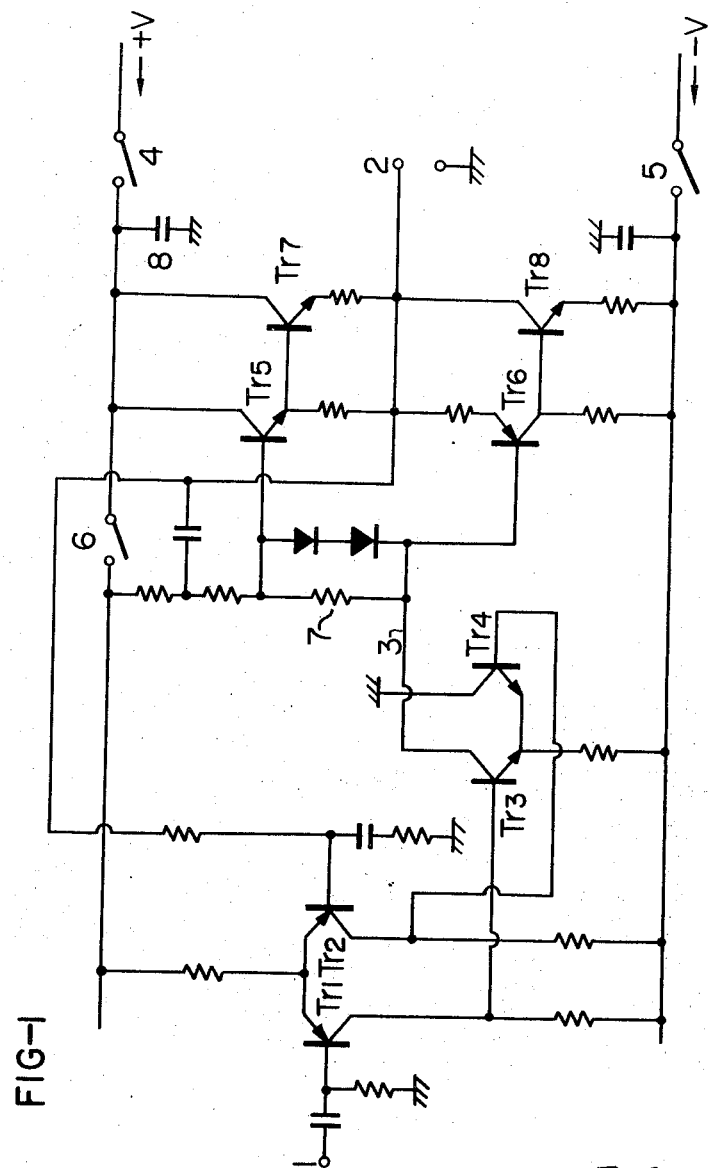
FIG. 1 is a circuit diagram of an OCL–SEPP amplifier which is one example of the load for a power supply system according to the present invention.

Referring to FIG. 1, the structure of a so-called quasi-complementary SEPP–OCL amplifier circuit well known in the art, which is a load of a positive and a negative power supply means, will be described by way of example in order to clarify the relation between the power supply means and the load before giving a detailed description of the present invention. The quasi-complementary SEPP–OCL amplifier circuit includes an input terminal 1, a pair of transistors $Tr_1$ and $Tr_2$ constituting a balanced differential amplifier, a pair of transistors $Tr_3$ and $Tr_4$ constituting another balanced differential amplifier, a pair of transistors $Tr_5$ and $Tr_6$ constituting a quasi-complementary driver, a pair of output transistors $Tr_7$ and $Tr_8$ constituting an SEPP–OCL stage together with the quasi-complementary driver, and an output terminal 2. An important feature of this circuit is that the potential at a point 3 connected to the collector of the transistor $Tr_3$ driving the quasi-complementary driver stage is nearly equal to zero and the output appearing at the output terminal 2 has a central operating point of zero potential level.

If the input applied to an OCL amplifier driven by two power supply means as shown in FIG. 1 is increased to an excessively large value or if the load of the amplifier is decreased to a small value or is reduced to zero or short-circuited with the result that the circuit, power supply means and load are placed in a dangerous state due to the appearance of an overcurrent at the output terminal 2, it is necessary to detect the overcurrent and simultaneously turn off switches 4 and 5 disposed in the power supply circuits by some suitable means so as to prevent any damage to the circuit, load and power supply means. However, in practice it has been found that the switch 4 or 6 disposed in one of the power supply circuits may merely be turned off to eliminate the dangerous state. This is because the transistors $Tr_3$ and $Tr_4$ are cut off when the power supply means on the side of the collector of the transistor $Tr_3$ is solely turned off in FIG. 1 and the output terminal 2 is clamped to zero potential. On the other hand, the operation of the transistors $Tr_3$ and $Tr_4$ is not affected by the power supply when the power supply means on the side of the emitter of the transistor $Tr_3$ is solely turned off. Thus, the collector potential of the transistor $Tr_3$ is determined by the state of the current flowing to the transistors $Tr_5$ and $Tr_6$ through a collector resistor 7 for the transistor $Tr_3$. Since the potential in this case is more positive than under normal operation, such a positive potential is applied to the output terminal 2 and the load such as a speaker may be damaged by burning. It is to be stated here that, when the power supply means on the side of the collector of the transistor $Tr_3$ is turned off, it is desirable that the condenser 8 has a small capacitance because such a condenser discharges in a short period of time and the output terminal 2 is quickly clamped to zero potential.

It will be seen in FIG. 1 that PNP and NPN transistors are suitably combined in such a manner that the transistors $Tr_3$, $Tr_4$, $Tr_7$ and $Tr_8$ are connected at their collector to the positive power supply means and at their emitter to the negative power supply means. From the manner of operation of these power supply means, the positive power supply means and the negative power supply means will be called hereinafter an active power supply means and a passive power supply means, respectively.

According to a first principle and practical embodiment of the present invention, there is provided a method of turning off an active power supply means as described above in response to an overcurrent.

Figure 2:
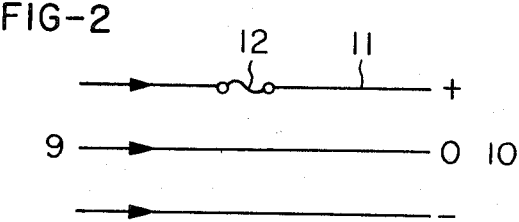
FIG. 2 is a power supply line diagram showing schematically an embodiment of the present invention.

Referring to FIG. 2, the reference numerals 9 and 10 designate the side of the active and passive power supply means and the side of a load such as an OCL amplifier as described above, respectively. It will be seen in FIG. 2 that a fuse 12 is disposed solely in the line 11 connecting the active power supply means to the OCL amplifier.

Figure 3:
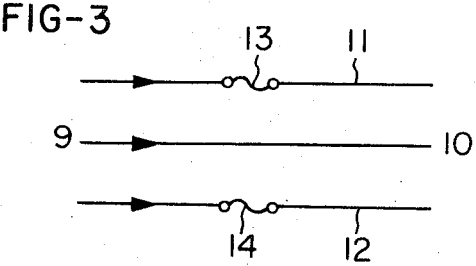
FIG. 3 is a power supply line diagram showing a modification of the embodiment shown in FIG. 2.

Referring to FIG. 3 showing a modification of the arrangement shown in FIG. 2, fuses 13 and 14 are disposed in the respective lines 11 and 12 connecting the active and passive power supply means to the load, and the current carrying capacity of the fuse 13 disposed in the line 11 is selected to be smaller than that of the fuse 14 disposed in the line 12. The reason why the current carrying capacity of the fuse 13 is selected to be smaller than that of the fuse 14 as well as the operation of the system will be readily apparent from the above description. It is self-evident that the same effect can be obtained by replacing the fuse by means such as a circuit breaker.

According to a second principle and practical structure of the present invention, there is provided a method and apparatus for automatically turning off an active power supply means as described above in response to the detection of an overcurrent.

Figure 4:
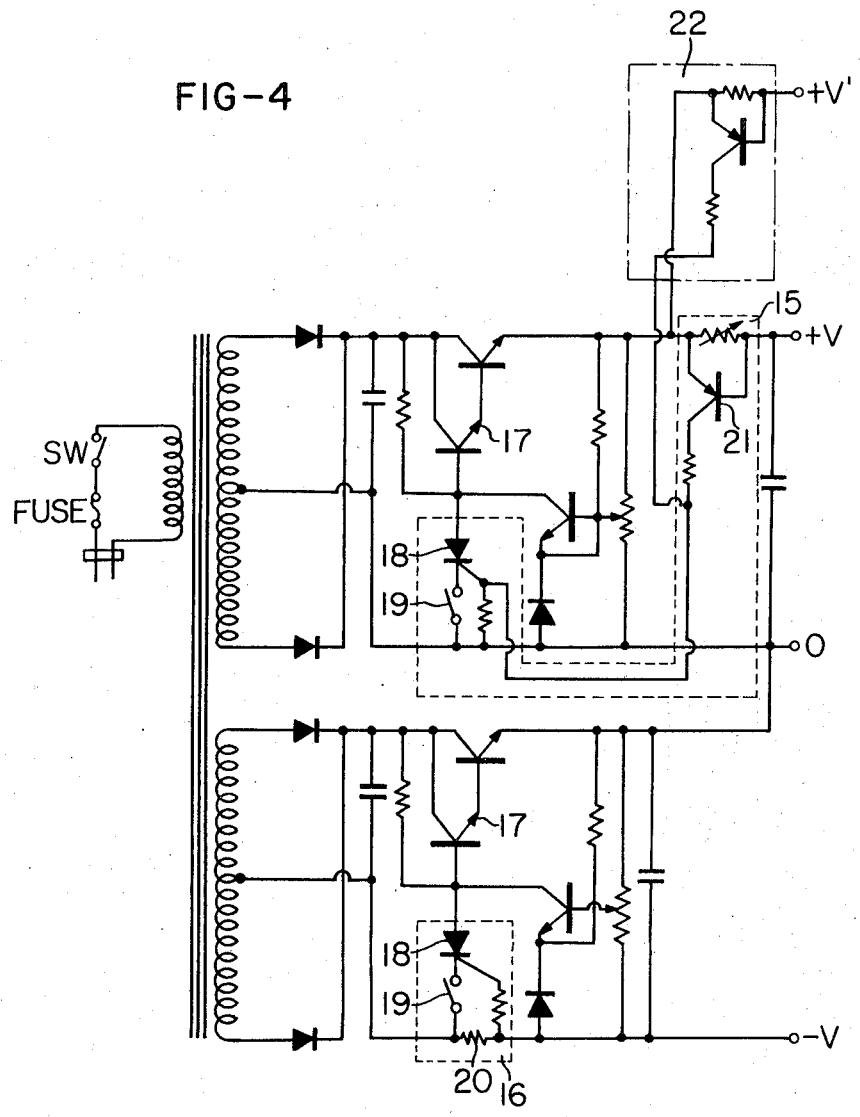
FIG. 4 is a circuit diagram showing the relation between another embodiment of the present invention and the constant-voltage power supply means.

FIG. 4 is a circuit diagram of a positive and a negative power supply means comprising well-known constant-voltage circuits and overcurrent detection and protection circuits 15 and 16. The constant-voltage circuits have a structure well known in the art and any description as to them is unnecessary. The structure and operation of the overcurrent detection and protection circuits 15 and 16 will be briefly described. In the overcurrent detection and protection circuit 16, a switch 19 is connected in series with a thyristor 18 connected between the base of a transistor 17 in the constant-voltage circuit and the terminal of —V volts. The switch 19 is normally in its closed position. When an overcurrent larger than a predetermined setting flows through a resistor 20 connected between the cathode and the gate of the thyristor 18, a voltage appears across the resistor 20 to apply a control signal to the gate of the thyristor 18 with the result that the thyristor 18 conducts and a transistor 21 in the constant-voltage circuit is cut off to interrupt the supply of power thereby protecting the power supply means and the load against danger. The switch 19 is provided to restore the thyristor 18 to its original state since the thyristor 18 is incapable of selfrestoration even when the overcurrent disappears. That is to say, the switch 19 is temporarily turned off to disconnect the cathode of the thyristor 18 from the circuit so as to restore the thyristor 18 to its original state. In the overcurrent detection and protection circuit 15, the overcurrent detection is done on the positive power supply side of the transistor 21 in view of the relation between the overcurrent detection and protection circuit 15 and the constant-voltage circuit, and the variation in the conducting state of the transistor 21 due to an overcurrent is applied to the gate of a thyristor 18 of substantially the same structure as that disposed in the overcurrent detection and protection circuit 16. Any other operation of the overcurrent detection and protection circuit 15 is substantially the same as that of the overcurrent detection and protection circuit 16.

Therefore, it is convenient to arrange in the following manner in the case of the system including the constant-voltage power supply means and the protection circuits according to the second principle of the present invention shown in FIG. 4. In the first place, the value of overcurrent detection at the positive power supply side may be selected to be slightly smaller than that at the negative power supply side so that the positive power supply side may be turned off earlier than the negative power supply side when the load is an OCL amplifier as shown in FIG. 1.

Figure 5:
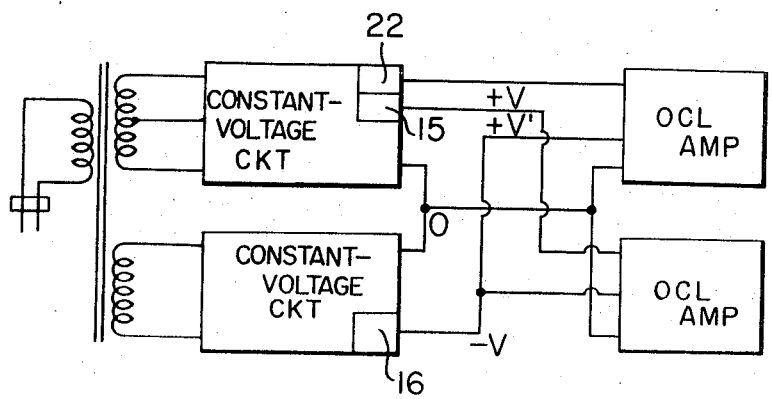
FIG. 5 is a block diagram showing the relation between the power supply means shown in FIG. 4 and two OCL–SEPP amplifiers.

In the second place, when two OCL amplifiers are employed for stereophonic sound reproduction and are connected to the power supply means as the load thereof, another overcurrent detection circuit 22 may be additionally provided at the positive power supply side as shown in FIG. 4, and the terminals of +V volts and +V' volts leading out from the respective overcurrent detection circuits 22 and 15 may be connected to the respective OCL amplifiers as shown in FIG. 5. In this arrangement, the negative terminal of —V volts is connected in common to the OCL amplifiers and it will be apparent that the value of overcurrent detection for the negative power supply means may be set at about twice that of the positive power supply means. By so setting, the circuit can be protected against an overcurrent which exceeds the allowable current value for each OCL amplifier.

According to a third principle of the present invention, there is provided a method of turning off a passive power supply in simultaneous relation with the turning-off of an active power supply in response to an overcurrent as described in the case of the first and second principles. An embodiment of the present invention according to the third principle provides means for immediately turning off one of the power supply means in response to the turning-off of the other power supply means instead of the previous arrangement in which the positive and negative power supply means are separately turned off at predetermined settings in response to an overcurrent.

Figure 6:
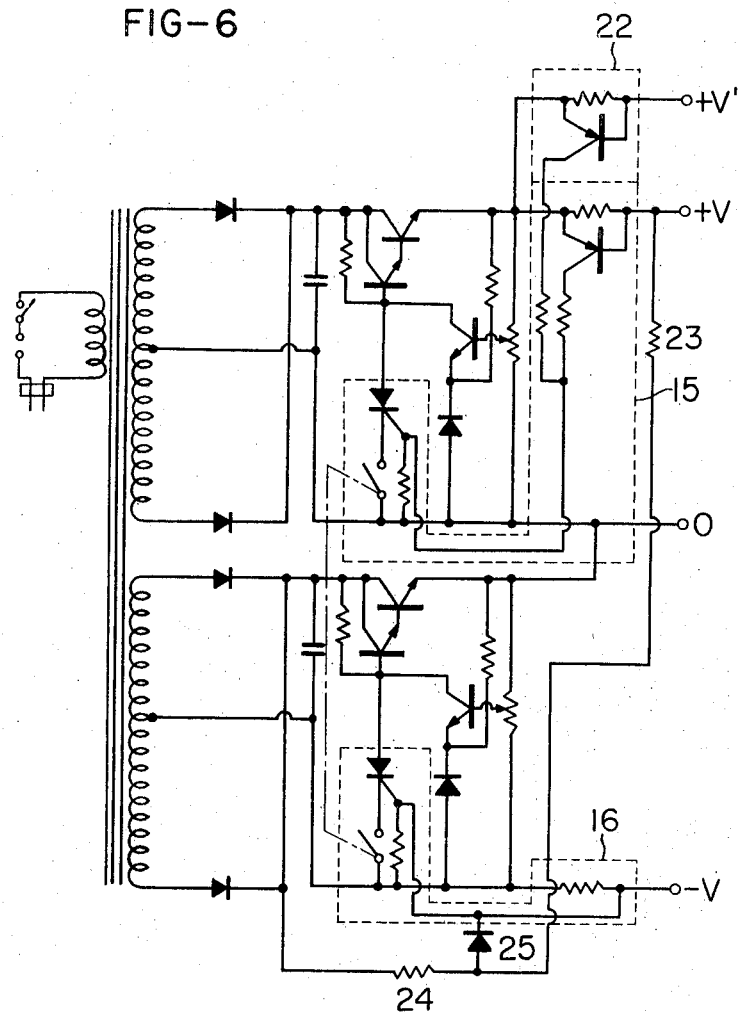
FIG. 6 is a circuit diagram showing the relation between a further embodiment of the present invention and constant-voltage power supply means.

The structure shown in FIG. 6 is generally similar to FIG. 4 except that resistors 23 and 24 and a diode 25 are additionally provided. When a positive power supply means is first turned off as previously described and the voltage of the positive power supply means is reduced to zero, a potential appears at a point which has been set at substantially a zero potential level during normal operation by the provision of the resistors 23 and 24, and a control signal is applied to the gate of a thyristor 18 through the diode 25 thereby to open the gate. Thus, the negative power supply means is turned off as soon as the positive power supply means is turned off.

Figure 7:
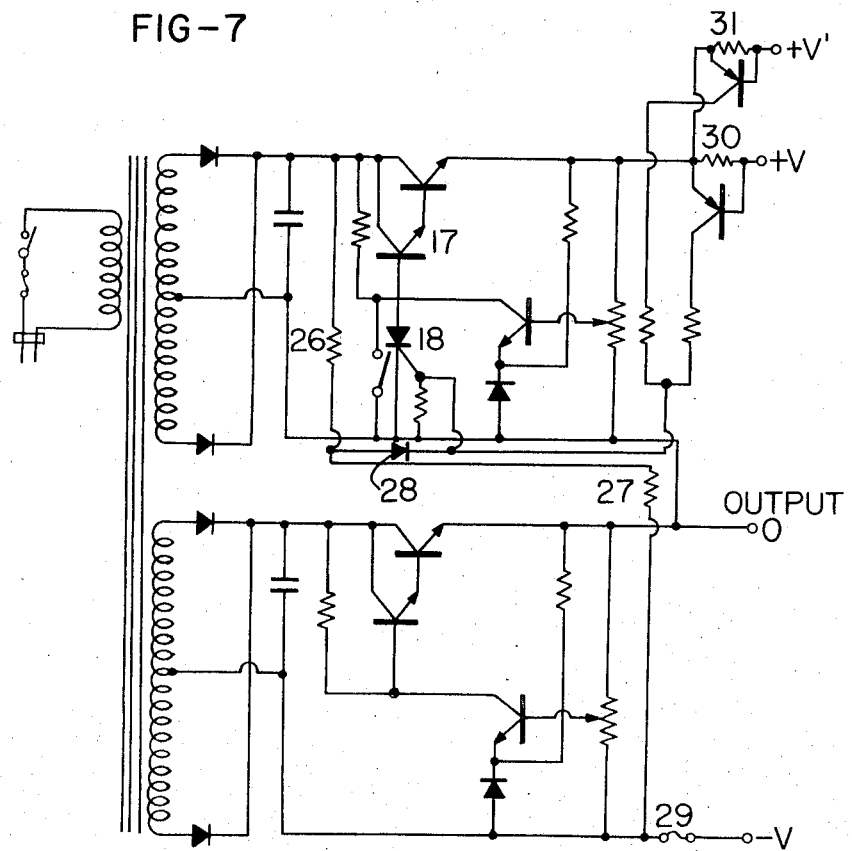
FIG. 7 is a circuit diagram showing the relation between a still further embodiment of the present invention and constant-voltage power supply means.

FIG. 7 shows one practical form of a positive and a negative power supply means according to the present invention for serving a load which includes two OCL (OTL) amplifiers of the kind shown in FIG. 1 for stereophonic sound reproduction. The current carrying capacity of the negative power supply means is so set as to sufficiently withstand the current developed during the full power operation of the two amplifiers, and a fuse 29 is provided to ensure protection against an overcurrent. Resistors 26 and 27 and a diode 28 similar to those shown in FIG. 4 are provided so as to turn off the positive power supply means as soon as the negative power supply means is turned off. Overcurrent protection for the respective OCL amplifiers is separately carried out by overcurrent detection circuits 30 and 31 associated with the positive power supply means. Thus, the OCL amplifiers, the load (speaker) for each OCL amplifier and the power supply means can be protected against an over-current by a relatively simple arrangement. It will be understood that, according to the third principle of the present invention, there is provided a method of turning off one of power supply means by automatically detecting the turning-off of the other power supply means. It is to be especially noted that the arrangement in which the active power supply means is not turned off in response to an overcurrent should be absolutely avoided when the power supply means is used in combination with an OCL amplifier.

Figure 8:
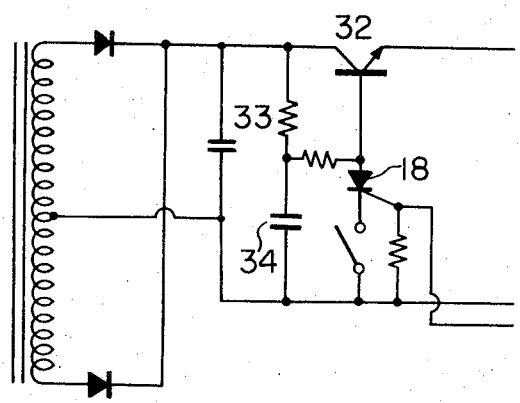
FIG. 8 is a circuit diagram showing the relation between the present invention and a ripple filter.
Figure 9:
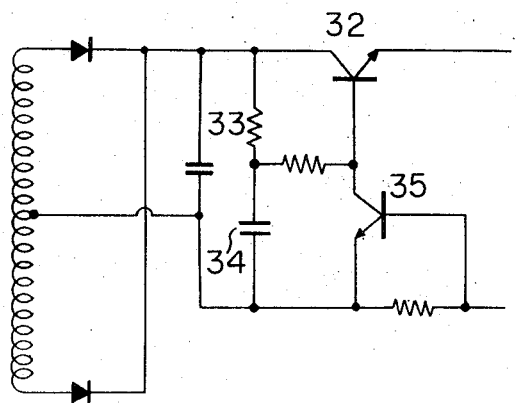
FIG. 9 is a circuit diagram showing the relation between the present invention and a transistor circuit.

Other examples based on the spirit of the present invention include a method of employing a ripple filter and combining it with an OCL amplifier. In other words, the present invention is applied to a well-known ripple filter circuit consisting of a transistor 32, a resistor 33 and a condenser 34 as shown in FIG. 8 in lieu of the constant-voltage power supply means shown in FIGS. 4 through 7. According to the present invention, a thyristor 18 connected to the base of the transistor 32 acts to cut off the transistor 32 in response to an overcurrent thereby to protect the system against the overcurrent as in the case of the constant-voltage power supply means. Alternatively, the transistor 32 may be cut off by an active control element such as a vacuum tube or transistor in lieu of the thyristor. Referring to FIG. 9 showing a modification of the system shown in FIG. 8, a transistor 35 is provided in lieu of the thyristor 18 so that the tendency of the transistor 35 to conduct due to a voltage appearing across a resistor 36 in response to an overcurrent is utilized to reduce or cut off the power supply voltage. It is apparent that this arrangement attains the same effect as that attained by the arrangement shown in FIG. 8. Further, the active or passive power supply means is determined depending on whether the voltage at the collector side of the transistor $Tr_3$ shown in FIG. 1 is positive or negative and the differential amplifier is not an absolute requirement. Furthermore, it is needless to say that the present invention may be combined with an overcurrent detection circuit including any suitable automatic restoring means.

While the principles and some embodiments of the present invention have been described in the foregoing, it will be apparent that the present invention is in no way limited to such specific embodiments and many changes and modifications may be made therein without departing from the spirit of the present invention. Those skilled in the art will appreciate that the present invention provides useful means for protecting OTL, OCL and like high-grade and high-fidelity amplifiers against damage.

What is claimed is:

1. A power supply system for a complementary single-end push-pull amplifier, said complementary single-end push-pull amplifier comprising an input signal receiving terminal, first and second amplification circuits which are connected in push-pull with respect to an output terminal for amplifying a signal applied to said input signal receiving terminal and producing an output at the output terminal, said output terminal being connected to a load, said push-pull amplifier further having first, second and common terminals, said power supply system comprising first and second power sources each having an output terminal and a common terminal coupled to the common terminal of said amplifier, the output terminal of said first power source having a polarity opposite to that of the output terminal of said second power source with respect to said common terminals, first means for connecting the output terminal of said first power source to the first terminal of said amplifier, said first means including means for interrupting an overcurrent therethrough when said overcurrent exceeds a predetermined value, and second means for connecting the output terminal of said second power source to the second terminal of said amplifier, said second means including means for maintaining the current therethrough at least until said first means has interrupted said overcurrent exceeding said predetermined value, said amplifier producing a DC output when said second power source only is disconnected from said amplifier and producing no DC output when said first power source only is disconnected from said amplifier.

2. A power supply system according to claim 1, wherein said second means connects said second power source permanently with said amplifier.

3. A power supply system according to claim 2, wherein said first means connects said first power source with said amplifier through a fuse wire which melts when subjected to said overcurrent.

4. A power supply system according to claim 2, wherein said first power source comprises a circuit having a control element adapted to conduct a controlled current from said first power source to said amplifier, and said first means comprises overcurrent detecting means for detecting said overcurrent and means for causing said control element to become nonconductive when said overcurrent detecting means detects said overcurrent.

5. A power supply system according to claim 1, wherein said second means comprises means for interrupting the current therethrough when said current exceeds a second predetermined value larger than said first-mentioned predetermined value.

6. A power supply system according to claim 1, wherein said first means connects said first power source to said amplifier through a fuse wire which melts with said overcurrent, and said second means connects said second power source to said amplifier through a fuse wire which melts only with a current higher than said overcurrent.

7. A power supply system according to claim 1, wherein each of said first and second power sources comprises a circuit having a control element adapted to conduct a controlled current from the respective power source to said amplifier, and said first means comprises overcurrent detecting means for detecting said overcurrent and means for causing said control element thereof to become non-conductive when said detecting means detect said overcurrent flowing therethrough, and said second means comprises overcurrent detecting means for detecting a current larger than said overcurrent and means for causing said control element to become non-conductive when said overcurrent detecting means detects said current.

8. A power supply system according to claim 1, comprising a plurality of said amplifiers each connected to said first and second power sources, and a plurality of said first means each being connected between said active power source and the respective amplifier and being responsive to said overcurrent flowing therethrough to cut off said overcurrent, said second means being connected between said second power source and said plurality of said amplifiers for cutting off said overcurrent when the overcurrent flowing therethrough exceeds another predetermined value depending on the number of said amplifiers.

9. A power supply system according to claim 1, wherein said second means comprises means for interrupting the current therethrough responsive to the interrupting operation of said first means.

10. A power supply system according to claim 9, wherein each of said first and second power sources comprises a circuit having a control element for conducting a controlled current from its own power source to said amplifier; said first means comprises overcurrent detecting means for detecting said overcurrent, and means for causing said control element of said one power source to become non-conductive when said overcurrent detecting means detect said over-current; and said second means comprises means for causing said control element of said other power source to become non-conductive when said control element of said one power source has been rendered non-conductive.

* * * * *